Feb. 21, 1967  P. A. VON MÜNCHHAUSEN ETAL  3,305,471
APPARATUS FOR SEPARATING MOLECULAR FRACTIONS
Filed Oct. 24, 1962  3 Sheets-Sheet 2
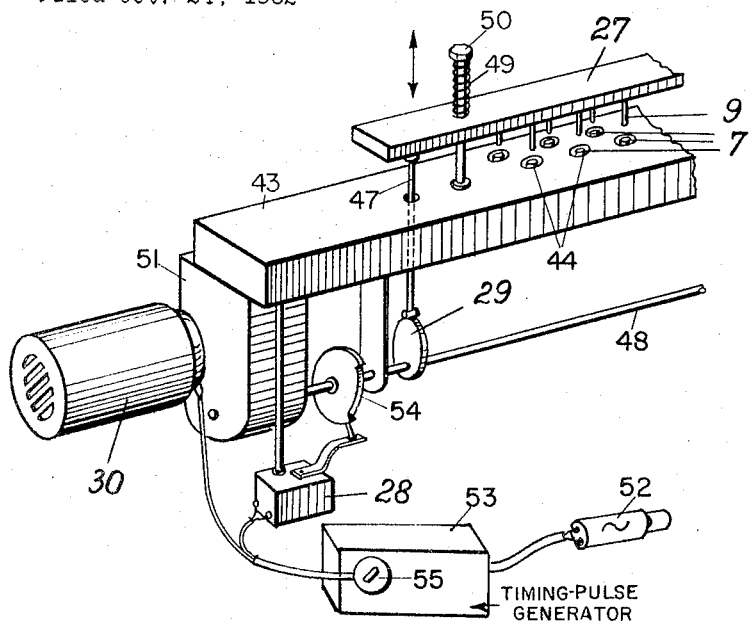
*Fig. 2*
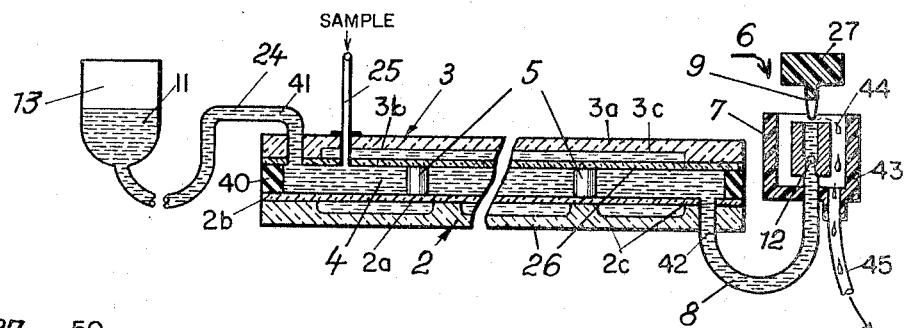
*Fig. 3*
*Fig. 5*
Philipp Adolf von Münchhausen
Gert Warnecke
*Inventors.*
By  Karl G. Ross
AGENT:

Feb. 21, 1967  P. A. VON MÜNCHHAUSEN ETAL  3,305,471
APPARATUS FOR SEPARATING MOLECULAR FRACTIONS
Filed Oct. 24, 1962  3 Sheets-Sheet 3
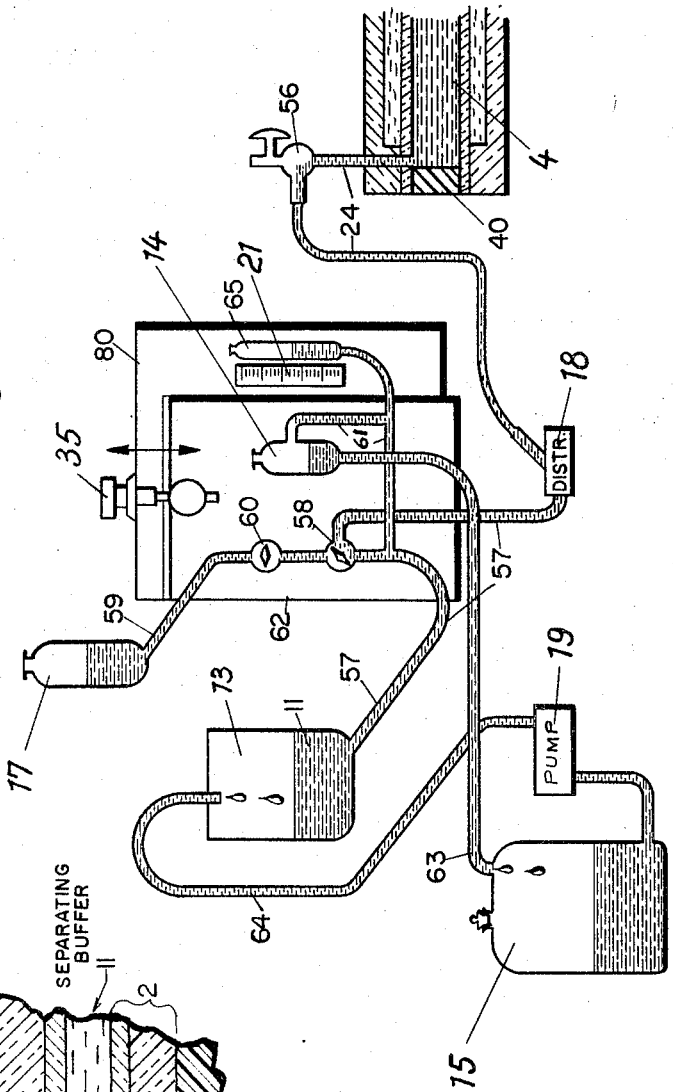
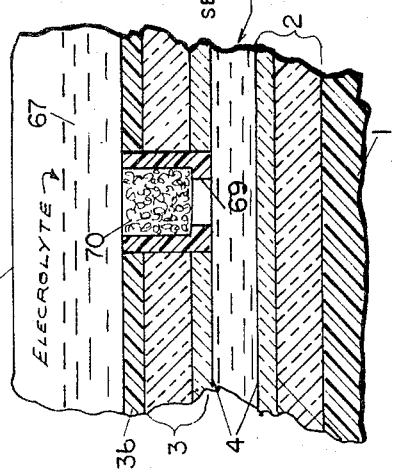
Philipp Adolf von Münchhausen
Gert Warnecke
*Inventors:*
*Karl F. Ross*
By AGENT:

United States Patent Office 3,305,471
Patented Feb. 21, 1967

3,305,471
APPARATUS FOR SEPARATING MOLECULAR FRACTIONS
Philipp Adolf von Münchhausen and Gert Warnecke, Berlin, Germany, assignors to Karl Marggraf, o.HG., Berlin, Germany, a corporation of Germany
Filed Oct. 24, 1962, Ser. No. 232,709
6 Claims. (Cl. 204—299)

Our present invention relates to an apparatus for continuously separating molecular fractions by electrophoresis.

In such electrophoretic apparatus it is customary to employ a buffer solution in which the fractions to be separated are dissolved, the solution being allowed to traverse a separation chamber within a unidirectional high-intensity electric field serving to modify the propagation characteristics of the several fractions in order to facilitate their selective recovery. If the flow of the liquid is horizontal but transverse to the direction of flow, fractions of different transfer coefficients will be deviated to different extents from the general direction of travel and may therefore be individually recovered from separate locations at the exit end of the chamber. Because of the considerable heating effect of the applied electric field, cooling of the chamber walls is essential for the maintenance of a reasonably constant and sufficently low operating temperature therein.

Systems of this type have until recently been constructed with carrier layers of capillary material, such as filter paper or glass fibers, disposed in the separation chamber to control the flow. The hoped-for constancy of the flow rate was, however, only imperfectly attained by such an arrangement since the flow velocity is proportional to the third power of the radius of a capillary and even minor dimensional changes could therefore entail considerable fluctuations in the transit time of the liquid. Such dimensional changes are often unavoidably produced by impact or vibration as well as a partial clogging of the fluid channels by air bubbles or entrained solids.

These and other inconveniences, including a high rate of evaporation, risk of atmospheric oxidation and the possibility of objectionable interaction between the carrier material and the dissolved molecular fractions, have led to the elimination of the capillary layer from the separation chamber and to the maintenance of laminar flow by a sufficiently close spacing of two horizontal guide surfaces (usually formed by a pair of glass plates) defining that chamber. Even so, however, the problem persisted of admitting the solution to the separation chamber and withdrawing it therefrom in a manner insuring the uniformity required for the obtention of reproducible test results.

It is, therefore, the general object of our present invention to provide an electrophoretic system of the character referred to in which measured quantities of a solution are admitted and withdrawn at the inlet and the outlet of a separation chamber, respectively, within a given time interval to maintain a uniform overall flow rate through the chamber.

A more particular object of this invention is to provide means for dosing the rate of admission and withdrawal in a manner independent of the construction of the separation chamber proper so that the constancy of test results will not be affected by, for example, the replacement of one or both glass plates.

It is also an object of our invention to provide means at the inlet and the outlet of the separation chamber for maintaining the liquid distribution substantially uniform in a transverse direction, i.e. parallel to the electric field, and for permitting the periodic withdrawal of measured quantities of solution from each of several transversely spaced locations at the chamber outlet.

The above objects are realized, in accordance with our instant invention, by the provision of a mechanism at the outlet of the separation chamber for periodically removing a predetermined quantity of liquid therefrom, in combination with a reservoir connected with the chamber inlet and provided with means for maintaining therein a constant level of fresh buffer solution to be supplied to the chamber. The withdrawal mechanism preferably comprises one or more vessels, advantageously in the form of one or more rows of upwardly open cups, which have overflow edges at the level of the liquid in the supply reservoir with which they communicate through the separation chamber so that normally these vessels are filled just to that level; by a periodic reduction of the volume of each vessel, in a preferred embodiment through the immersion of a plunger from above, a measured amount of liquid is discharged into an associated container and is promptly replaced by fresh solution from the reservoir. In order to prevent the return of any displaced liquid to the separation chamber, we prefer to insert check valves between each vessel and an outlet manifold advantageously extending over the width of the separation chamber at its discharge end; a similar inlet manifold, possibly with fewer connecting conduits, may link the entrance end of that chamber with the reservoir.

Because the maintenance of a substantially constant hydrostatic head at the reservoir is essential for the desired leveling effect, special precautions should be taken if the electric field is produced in known manner with the aid of a pair of electrolyte containers extending laterally of the separation chamber and communicating with its interior. The passages for establishing such communication, which may traverse the upper of the two glass plates forming the chamber, can for this purpose be so designed as to constitute both an ionic and a hydrostatic barrier between the electrolyte and the buffer solution, e.g. by containing an insert of limited permeability made, for example, of compacted fibrous material.

The above and other objects, features and advantages of our invention will become more fully apparent from the following detailed description with reference to the accompanying drawing in which:

FIG. 2 is a fragmentary perspective and partly diagrammatic view of the withdrawal mechanism of the apparatus shown in FIG. 1;

FIG. 3 is a sectional elevational view of the separation chamber and adjoining elements forming part of the apparatus;

Figure 1:
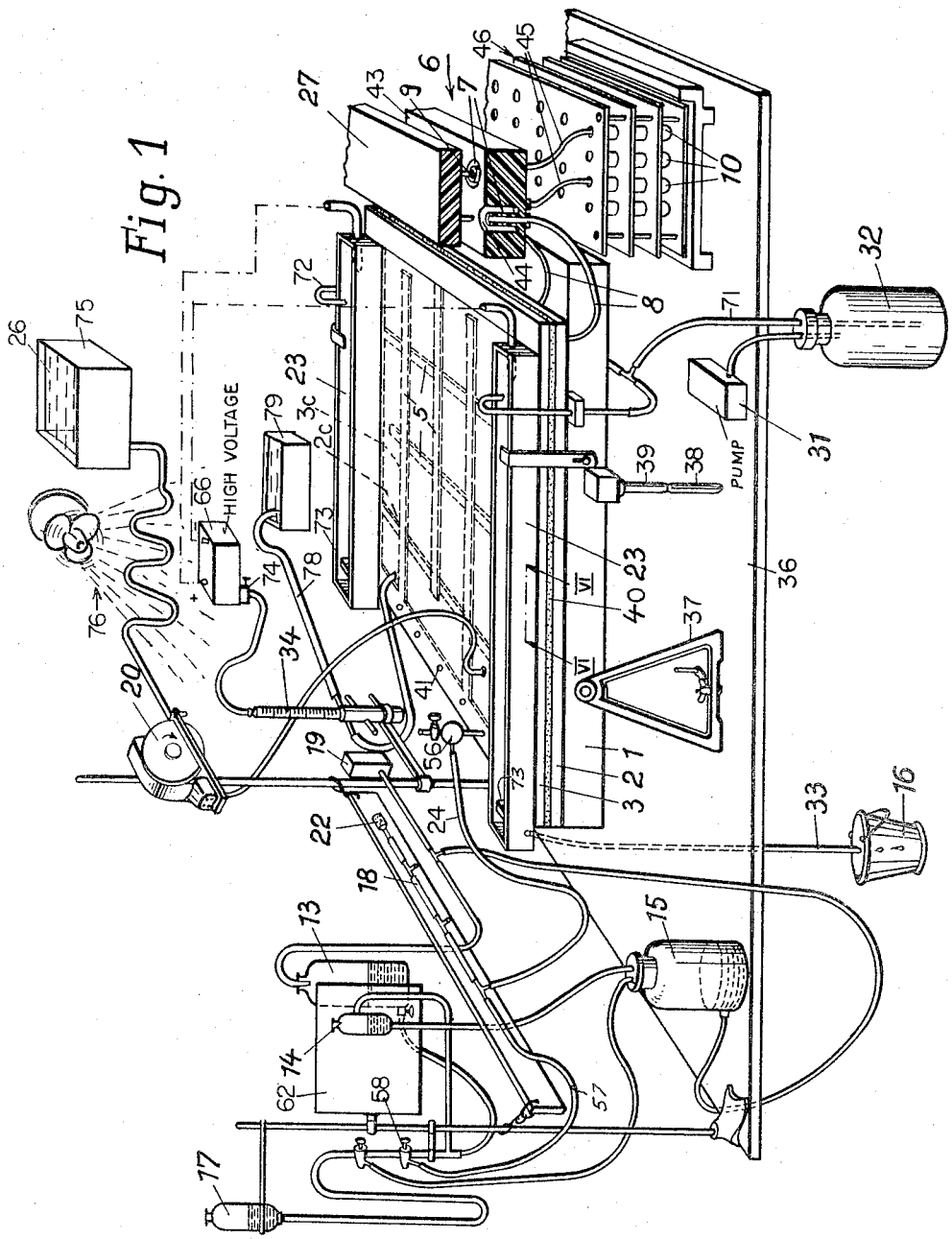
FIG. 1 is a perspective and partly diagrammatic overall view (parts broken away) of an apparatus embodying the invention.

FIG. 4 schematically illustrates the level-control means associated with the supply reservoir of the apparatus;

FIG. 5 is a side-elevational view of the discharge end of the apparatus; and

FIG. 6 is an enlarged sectional view taken substantially on the line VI—VI of FIG. 1.

A base plate 1 of polished marble, granite or other thermally stable structural material is supported on a table 36 with the aid of triangular legs 37 and leveling bolts 38 projecting from threaded sleeves 39. The base plate 1 carries a pair of glass plates 2, 3 which are spaced apart along their edges by sealing strips 40, made advantageously of a material of high chemical resistance such as silicone rubber, and at intermediate points by disks 5, e.g. of Teflon or similar attack-resistant plastic material. The glass plates 2 and 3, which may have a width of about 50 cm. in each major dimension, are disposed close to each other with a vertical spacing of, say, 0.3 to 0.8 mm. to define a separation chamber 4 between them. Each glass plate, as best seen in FIGS. 3 and 6, is laminated from two sheets 2a, 2b and 3a, 3b, respectively, which are separated by internal ribs 3c to form meandering fluid channels designed to accommodate a cooling medium; as will be apparent from FIG. 1, the fluid-guiding ribs 2c, 3c intersect orthogonally so that the main directions of coolant flow will be at right angles to each other in the two plates. The disks 5 are advantageously disposed at the intersections of ribs 2c and 3c, with sufficient mutual spacing to minimize their interference with the flow of solution through chamber 4, for the purpose of effectively supporting the plates 2 and 3 against relative deformation (e.g. sagging).

An inlet manifold at the entrance end of the separation chamber 4 is constituted by a plurality of bores 41 in the upper glass plate 3, seven such bores being shown in the embodiment illustrated. A similar outlet manifold comprises an equal or larger number of bores 42 in the lower glass plate 2 at the exit end of the chamber. The bores 42 are connected via individual conduits 8 to a withdrawal mechanism, generally designated 6, whose principal parts may be constructed of a suitable hard plastic, rubber or the like and which includes a header 43 formed with a multiplicity of upwardly open overflow vessels 44 within which a like number of upwardly open measuring cups 7 are concentrically disposed. At the points where the conduits 8 enter the cups 7 from below, check valves 12 are disposed to prevent the return of liquid from the cups to the separation chamber 4; these check valves can simply consist of mushroom-shaped studs freely resting on annular seats at the bottoms of the cups. A discharge conduit 45 leads from each overflow vessel 44 to a respective sampling tube 10 supported on a rack 46.

The bores 41 of the inlet manifold communicate through respective conduits 24 with a reservoir 13 wherein a buffer liquid 11 is maintained, by means described hereinafter, at a level in line with the upper edges of the cups 7 whereby these cups will normally be filled to the brim with the liquid 11. The withdrawal mechanism 6 further comprises a bar 27 from which a multiplicity of pins 9 project downwardly toward the cups 7 respectively aligned therewith. Bar 27 is vertically reciprocable to immerse the pins 9 into the cups 7 so that the liquid contained therein will be partially displaced to overflow the edges of the cups and to pass into the respective vessels 44 for delivery to the sampling tubes 10. Upon the upward withdrawal of bar 27 with its pins 9, fresh liquid 11 from reservoir 13 flows into the bores 41 of the inlet manifold while treated solution from chamber 4 surges into the cups 7 to replenish the liquid volume therein.

FIGS. 1, 2 and 5 illustrate the means by which the bar 27 is reciprocated periodically to empty the cups 7. Each end of this bar is supported by a push rod 47 which bears upon a cam 29 on a shaft 48 under pressure of a spring 49 on a respective stem 50 rising from the header 43. Shaft 48 is driven, through a reduction gear 51, from an electromotor 30 whose energizing circuit includes a source 52 of alternating current and a timing-pulse generator 53. A switch cam 54 on shaft 48 operates a circuit breaker 28 which de-energizes motor 30 until the next timing pulse from generator 53 re-energizes the motor and maintains it operated for the major part of a shaft revolution, e.g. with the aid of a conventional relay (not shown) adapted to lock over contacts of circuit breaker 28 which are closed at that time by the high dwell of cam 54. The interval between timing pulses is large in comparison with the duration of a revolution of shaft 48 so that the draining of the cups 7 takes place within a small fraction of an operating cycle of mechanism 6. A master switch 55 starts and stops the timer 53 to initiate and to terminate a series of reciprocations of pin support 27 with resultant periodic discharge of liquid from cups 7. It will be noted that the fluid flow through the separation chamber 4 is interrupted whenever the mechanism shown in FIG. 4 is held stationary.

Reference will now be made to FIGS. 1 and 4 for a detailed description of the means used to maintain a constant liquid level in reservoir 13. The inlet conduits 24, illustrated only schematically in FIG. 3, lead past bleeder valves 56 to a distributor 18 whose inlet end is connected to reservoir 13 via a flexible conduit 57 with a shut-off valve 58; the opposite end of the distributor is closed by a plug 22. Another conduit 59 branches off from conduit 57 toward an auxiliary solution container 17 which is normally sealed off by a valve 60.

An overflow vessel 14 is connected via a further branch conduit 61 with conduit 57, the conduit 61 entering the vessel 14 at the level to be maintained within reservoir 13 which is adjustable by means of a screw 35 controlling the position of a vertically shiftable mounting panel 62 on which the vessel 14 is supported. Vessel 14 drains through a flexible conduit 63 into a main storage tank 15 containing a large supply of buffer liquid, this liquid being continuously fed via a further conduit 64 to reservoir 13 at a rate slightly exceeding the total rate of withdrawal of buffer liquid by the mechanism 6 as averaged over an operating cycle of that mechanism. A sight glass 65, rigidly secured to vessel 14 through the intermediary of conduit 61, is disposed next to a scale 21 on a stationary support 80 for panel 62 to give an absolute reading of the liquid level to be maintained by the assembly of FIG. 4. Whenever this level has dropped upon a withdrawal of pins 9 from the cups 7 (FIG. 2), the influx of fresh liquid circulated by pump 19 will cause the level in vessels 13 and 65 and in conduit 61 to rise until the excess is returned to tank 15 by overflowing from that conduit into vessel 14 and thence trickling back into the tank at substantially the rate at which it is pumped into the reservoir 13. The re-establishment of the proper level in the control system of FIG. 4 is followed with a slight lag by a rise of solution in cups 7 to the same level, i.e. to the overflow edges of these cups, whereupon the cycle is repeated.

A high-voltage direct-current source 66, shown schematically in FIG. 1, is connected across a pair of electrodes constituted by elongated troughs 23 of insulating material which rest on upper glass plate 3 and are filled with a volume of electrolyte 67 (FIG. 6). The liquid 67 may be a solution identical with liquid 11 but of substantially twice the concentration of the latter. A series of throughgoing passages 68 (one shown in FIG. 6) in the bottom of each trough 23 and in the supporting glass plate 3, to which the trough may be adhesively secured, establish contact between the liquid 11 in separation chamber 4 and the liquid 67 connected across power supply 66 to maintain a supbstantially uniform electric field transverse to the direction of liquid flow within chamber 4. While a certain shunting effect due to the presence of a common distributor 18 and reservoir 13 is unavoidable, tests have shown that the current path through the narrow tubes 24 has a resistance many times higher than the electrolytic resistance of the fluid in chamber 4 so that the current loss through that shunt is negligible. The passages 68 are lined by nipples 69, preferably of hard rubber or suitable (e.g. acrylic) plastic material, which may be cemented in place therein and contain inserts 70 of limited permeability designed to prevent the mixing of the solutions, i.e. to insulate them ionically from each other. We prefer to use as the limitedly permeable inserts 70 a mixture of tightly packed asbestos fibers and rock wool which, by presenting a multiplicity of capillary flow channels, also insulates the electrolyte 67 hydrostatically from the liquid 11 traversing the interior of chamber 4.

To prevent polarization, the troughs 23 are continuously flushed with fresh solution 67 supplied from a container 32 through a conduit 71 which terminates in a pair of goosenecks 72 above the troughs. A membrane pump 31 introduces air into the container 32 at such a rate that the liquid enters the troughs 23 in discontinuous drops to prevent any short-circuiting. The overflow across a partition 73 in each trough is discharged into a pair of pails (only one shown) through drain pipes 33.

The high-voltage source 66 is controlled by a switch 74 responsive to a temperature sensor 34 which is included in the return path of the circulation system supplying cooling fluid 26 to the upper glass plate 3. This system comprises, as illustrated diagrammatically in FIG. 1, a supply tank 75 for the fluid (e.g. water), a cooling unit 76 therefor, a dosing pump 20 working into a feeder tube 77, and a return tube 78 having the instrument 34 inserted therein. A sink 79, receiving the spent coolant from tube 78, could of course be combined with tank 75 if a closed circulatory system were desired. The analogous system for lower glass plate 2 has not been illustrated. It will be apparent that, if either cooling system should become inoperative, the corresponding sensor 34 would cut out the power supply 66 to prevent overheating of the apparatus; naturally the timing circuit 30, 52, 53 in FIG. 2 could be disabled at the same time by the sensor to arrest the withdrawal mechanism 6.

The admission of the sample to be analyzed by the apparatus takes place, intermittently or continuously, through one or more capillary tubes 25 (FIG. 3) which penetrate the upper guide plate 3 and open into the separation chamber 4 at a suitable location near the inlet edge to enable the lateral drifting of the more mobile fractions under the influence of the transverse electric field while the current carries them to the outlet stage. The hydrostatic pressure within chamber 4 is left substantially unaffected by the presence of this supply system in view of the narrow caliber of the tube or tubes 25.

When it is desired to purge the supply conduits 24 of air and to flush the separation chamber 4 prior to initiation of a new test series, valves 58 and 60 are reversed to connect the distributor 18 to the more elevated solution container 17 rather than to the reservoir 13, the added hydrostatic head of the liquid thus causing a flooding of the system; air present in the conduits 24 may be expelled at the same time by the opening of the associated bleeder valves 56 until the liquid begins to issue therefrom.

It will thus be apparent that we have disclosed an electrophoretic device which is easy to operate, requires but little maintenance and can be taken repeatedly into and out of service without any refilling of its separation chamber. Modifications of the specific arrangement described and illustrated are, of course, possible and, to the extent that they are apparent to persons skilled in the art, are intended to be embraced in the spirit and scope of the invention as defined in the appended claims.

We claim:

1. An apparatus for the continuous electrophoretic separation of molecular fractions in a buffer solution, comprising a pair of closely adjacent bodies with vertically spaced horizontal guide surfaces forming a separation chamber between them, inlet means at one end of said chamber for admitting the buffer solution thereto, outlet means at the opposite end of said chamber for withdrawing said buffer solution therefrom and establishing a continuous flow of solution from said one end to said opposite end, electrode means at said chamber for creating a unidirectional horizontal electric field transverse to said flow within said chamber, cooling means adjacent said surfaces for maintaining said chamber at a substantially constant operating temperature, said inlet means including a reservoir having level-control means for maintaining therein a substantially constant hydrostatic head of solution in communication with said chamber, said outlet means including receptacle means with an overflow edge at the level of the liquid in said reservoir, and mechanism for periodically reducing the volume of said receptacle means by a predetermined extent, thereby discharging therefrom a measured amount of solution across said overflow edge, said receptacle means comprising a plurality of vessels and conduit means connecting said vessels with said chamber, said vessels being provided with check-valve means at said conduit means for preventing a return of liquid therefrom to said chamber, said vessels being upwardly open, said mechanism including a set of plungers respectively aligned with said vessels and vertically movable support means for said plungers periodically operable to immerse the latter into said vessels.

2. An apparatus for the continuous electrophoretic separation of molecular fractions in a buffer solution, comprising a pair of closely adjacent hollow glass plates with internal fluid-guiding means and with vertically spaced horizontal guide surfaces forming a separation chamber between them, inlet means at one end of said chamber for admitting the buffer solution thereto, outlet means at the opposite end of said chamber for withdrawing said buffer solution therefrom and establishing a continuous flow of solution from said one end to said opposite end, electrode means electrolytically connected to the interior of said chamber for creating a unidirectional horizontal electric field transverse to said flow within said chamber, a source of cooling fluid communicating with the interior of said glass plates for maintaining said chamber at a substantially constant operating temperature, said inlet means including a reservoir having level-control means for maintaining therein a substantially constant hydrostatic head of solution in communication with said chamber, said outlet means including receptacle means with an overflow edge at the level of the liquid in said reservoir, and mechanism for periodically reducing the volume of said receptacle means by a predetermined extent, thereby discharging therefrom a measured amount of solution across said overflow edge, said receptacle means comprising a plurality of upwardly open vessels each provided with an individual conduit leading to said chamber and with a check valve at the discharge end of said conduit, said mechanism including a set of plungers respectively aligned with said vessels, a common support for said plungers and drive means for vertically oscillating said support, thereby periodically immersing said plungers into said vessels.

3. An apparatus for the continuous electrophoretic separation of molecular fractions in a buffer solution, comprising a pair of closely adjacent bodies vertically spaced with horizontal guide surfaces forming a separation chamber between them, an inlet manifold at one end of said chamber for admitting the buffer solution thereto, an outlet manifold at the opposite end of said chamber for withdrawing said buffer solution therefrom and establishing a continuous flow of solution from said one end to said opposite end, electrode means at said chamber for creating a unidirectional horizontal electric field transverse to said flow within said chamber, cooling means adjacent said surfaces for maintaining said chamber at a substantially constant operating temperture, a reservoir connected to said inlet manifold and provided with level-control means for maintaining therein a substantially constant hydrostatic head of solution in communication with said chamber, receptacle means connected to said outlet manifold and provided with an overflow edge at the level of the liquid in said reservoir, and mechanism for periodically reducing the volume of said receptacle means by a predetermined extent, thereby discharging therefrom a measured amount of solution across said overflow edge, said receptacle means comprising a plurality of upwardly open vessels each provided with an individual conduit leading to said chamber and with a check valve at the discharge end of said conduit, said mechanism including a set of plungers respectively aligned with said vessels, a common support for said plungers and drive means for vertically oscillating said support, thereby periodically immersing said plungers into said vessels.

4. An apparatus as defined in claim 3 wherein said drive means comprises a rotatable shaft, a cam disk on said shaft, an electric motor coupled with said shaft, cam-follower means on said support bearing upon said cam means, circuit-breaker means coupled with said shaft for de-energizing said motor after each shaft revolution, and timer means for re-energizing said motor at predetermined intervals.

5. An apparatus for the continuous electrophoretic separation of molecular fractions in a buffer solution, comprising a pair of closely adjacent hollow glass plates with internal fluid-guiding means and with vertically spaced horizontal guide surfaces forming a separation chamber between them, an inlet manifold at one end of said chamber for admitting the buffer solution thereto, an outlet manifold at the opposite end of said chamber for withdrawing said buffer solution therefrom and establishing a continuous flow of solution from said one end to said opposite end, electrode means electrolytically connected to the interior of said chamber for creating a unidirectional horizontal electric field transverse to said flow within said chamber, a source of cooling fluid communicating with the interior of said glass plates for maintaining said chamber at a substantially constant operating temperature, a reservoir connected to said inlet manifold and provided with level-control means for maintaining therein a substantially constant hydrostatic head of solution in communication with said chamber, receptacle means connected to said outlet manifold and provided with an overflow edge at the level of the liquid in said reservoir, and mechanism for periodically reducing the volume of said receptacle means by a predetermined extent, thereby discharging therefrom a measured amount of solution across said overflow edge, said receptacle means comprising a plurality of upwardly open vessels each provided with an individual conduit leading to said chamber and with a check valve at the discharge end of said conduit, said mechanism including a set of plungers respectively aligned with said vessels, a common support for said plungers and drive means for vertically oscillating said support, thereby periodically immersing said plungers into said vessels.

6. An apparatus as defined in claim 5 wherein said electrode means comprises a pair of troughs extending laterally along said glass plates and resting on the upper one of said glass plates, said upper glass plate and said troughs having throughgoing passages provided with a porous insert of limited permeability for ionically and hydrostatically insulating said solution from an electrolyte liquor in said troughs.

References Cited by the Examiner
UNITED STATES PATENTS

| | | | |
|---|---|---|---|
| 3,085,956 | 4/1963 | Caplan | 204—299 |
| 3,125,500 | 3/1964 | Grassman | 204—299 |

FOREIGN PATENTS

| | | |
|---|---|---|
| 846,988 | 7/1949 | Germany. |
| 174,270 | 2/1961 | Sweden. |

OTHER REFERENCES

Leolerer, Chromotographic Reviews, volume 3, 1961, pages 56–66.

JOHN H. MACK, *Primary Examiner.*

MURRAY TILLMAN, *Examiner.*

G. E. BATTIST, E. ZAGARELLA, *Assistant Examiners.*